(12) United States Patent  
Potnis et al.

(10) Patent No.: US 10,532,698 B2  
(45) Date of Patent: Jan. 14, 2020

(54) TRAILER ANGLE DETECTION USING REAR BACKUP CAMERA

(71) Applicant: MAGNA ELECTRONICS INC., Auburn Hills, MI (US)

(72) Inventors: Anuj S. Potnis, Pune (IN); Krishna Koravadi, Rochester Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 16/033,416

(22) Filed: Jul. 12, 2018

(65) Prior Publication Data

US 2019/0016264 A1    Jan. 17, 2019

Related U.S. Application Data

(60) Provisional application No. 62/533,694, filed on Jul. 18, 2017, provisional application No. 62/532,412, filed on Jul. 14, 2017.

(51) Int. Cl.
| | |
|---|---|
| *B60R 1/00* | (2006.01) |
| *B62D 13/06* | (2006.01) |
| *B60D 1/64* | (2006.01) |
| *G06N 3/08* | (2006.01) |
| *G06T 7/73* | (2017.01) |

(52) U.S. Cl.
CPC ............. *B60R 1/003* (2013.01); *B60D 1/64* (2013.01); *B62D 13/06* (2013.01); *G06N 3/08* (2013.01); *G06T 7/75* (2017.01); *B60R 2300/105* (2013.01); *B60R 2300/303* (2013.01); *B60R 2300/808* (2013.01); *G06T 2207/30252* (2013.01)

(58) Field of Classification Search
CPC ..... B60R 1/003; B60R 1/00; B60R 2300/105; B60R 2300/303; B60R 2300/808; G06T 7/75; G06T 2207/30252; B60D 1/245; B60D 1/62; B60D 1/64; B62D 13/06; B62D 15/023; G06N 3/08
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 6,690,268 B2 | 2/2004 | Schofield et al. |
| 9,085,261 B2 | 7/2015 | Lu et al. |

(Continued)

*Primary Examiner* — John R Schnurr  
(74) *Attorney, Agent, or Firm* — Honigman LLP

(57) ABSTRACT

A method for determining trailer angle includes determining angles of a trailer hitch relative to a data recording device via an angle measuring device while the trailer hitch pivots about a hitch ball of the device. While the trailer hitch pivots about the hitch ball of the device, trailer hitch information is determined responsive to processing of captured image data and responsive to determined angles of the trailer hitch. After determining trailer hitch information, data representative of the determined information is provided to an electronic device, which is disposed at a vehicle having a rear backup camera that has a field of view that encompasses a hitch ball of the vehicle and at least a portion of a hitch of a trailer hitched to the vehicle. Using the provided data, and responsive to processing of captured image data, an angle of the trailer relative to the vehicle is determined.

19 Claims, 8 Drawing Sheets

(56) References Cited

U.S. PATENT DOCUMENTS

| | | |
|---|---|---|
| 10,192,113 B1 * | 1/2019 | Liu .................... G06K 9/00664 |
| 2014/0085472 A1 | 3/2014 | Lu et al. |
| 2014/0160276 A1 | 6/2014 | Pliefke et al. |
| 2014/0324295 A1 * | 10/2014 | Lavoie ................... B62D 13/06 701/41 |
| 2015/0002670 A1 | 1/2015 | Bajpai |
| 2015/0217693 A1 | 8/2015 | Pliefke et al. |
| 2017/0050672 A1 | 2/2017 | Gieseke et al. |
| 2017/0217372 A1 | 8/2017 | Lu et al. |
| 2017/0254873 A1 | 9/2017 | Koravadi |
| 2017/0305462 A1 * | 10/2017 | Janardhana ............ B62D 13/06 |
| 2018/0025237 A1 | 1/2018 | Pliefke et al. |
| 2018/0211528 A1 | 7/2018 | Seifert |
| 2018/0215382 A1 | 8/2018 | Gupta et al. |
| 2018/0251154 A1 | 9/2018 | Lu et al. |
| 2018/0253608 A1 | 9/2018 | Diessner et al. |
| 2018/0272941 A1 * | 9/2018 | Bliss ................. B62D 15/0295 |
| 2018/0276838 A1 | 9/2018 | Gupta et al. |
| 2018/0276839 A1 | 9/2018 | Diessner et al. |
| 2018/0299885 A1 * | 10/2018 | Herzog ................. B62D 13/06 |

\* cited by examiner

TRAILER ANGLE DETECTION USING REAR BACKUP CAMERA

CROSS REFERENCE TO RELATED APPLICATIONS

The present application is related to U.S. provisional applications, Ser. No. 62/533,694, filed Jul. 18, 2017, and Ser. No. 62/532,412, filed Jul. 14, 2017, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

At present, the trailer angle (the angle of a towed trailer relative to the towing vehicle) is determined utilizing a target reference installed on the trailer tongue, where a rear camera of the towing vehicle locates this target pattern and the system estimates the trailer angle. But this method requires the user to install the target pattern sticker on the trailer tongue for each trailer and enter the distance measurements related to the location of the target pattern sticker. There are several issues associated with such an approach, including that the user may make measurement errors, the target pattern sticker may get dirty, and/or the user may forget to install the sticker.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and provides a system and method for determining the angle of the trailer without the use of a target pattern. The system and method uses the trailer images (as captured by the vehicle's rear backup camera) and the corresponding ground truth angle information to train a neural network, such as, for example, a Convolution Neural Network (or other suitable machine learning algorithm). The trained model is then deployed at a vehicle. This model, when subjected to a test image, will then predict the correct angle by looking at or processing the image data. The test image is preprocessed before feeding into the Convolution Neural Network (CNN). Preprocessing may include, but is not limited to, operations such as scaling the image, cropping the image, and/or transforming the image. With the use of communication network bus (such as a CAN bus) data, trailer tracking will be used to obtain a more robust estimate of the angle.

These and other objects, advantages, purposes and features of the present invention will become apparent upon review of the following specification in conjunction with the drawings.

LEGEND

Figure 1:
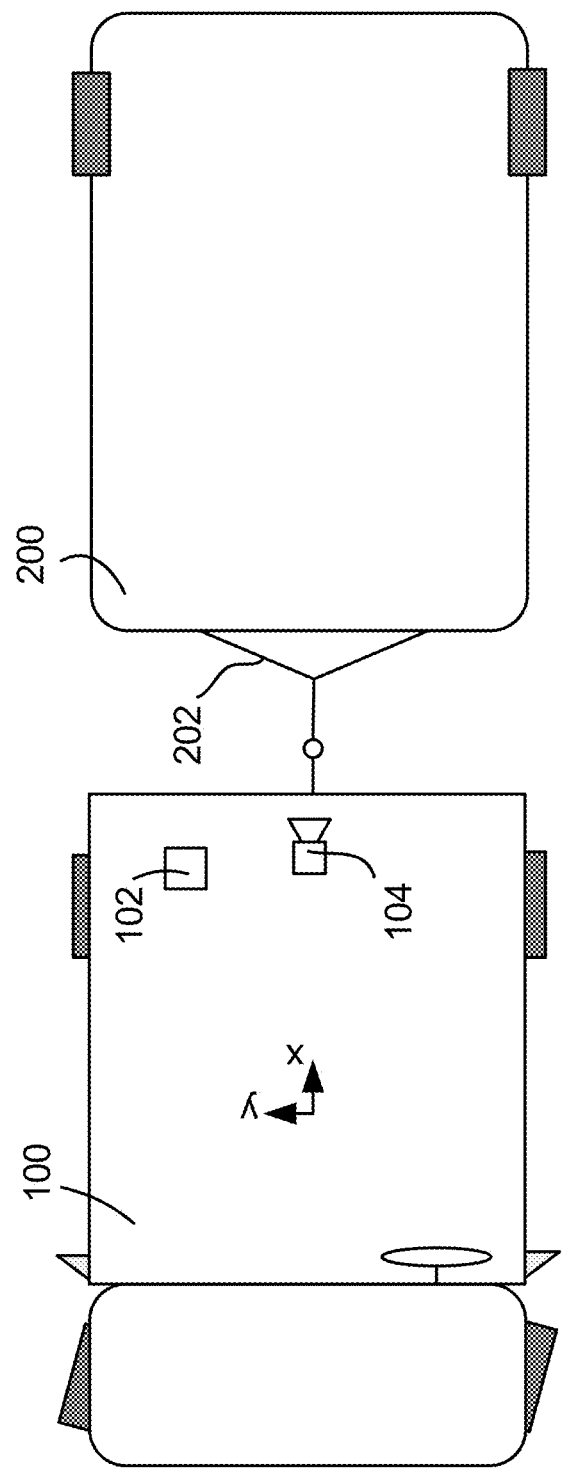
FIG. 1 is a plan view of a vehicle attached to trailer equipped with trailer angle determination system in accordance with the present invention.

100 Subject vehicle equipped with backup camera and camera processing ECU
100a Data recording device or vehicle
102 Camera processing ECU
104 Backup camera at subject vehicle
104a camera at data recording device or vehicle
105 Data recorder
106 Preprocessing module
108 Convolution Neural Network
110 Trailer angle estimation and tracking module
111 Vehicle communication bus (CAN/FlexRay etc.)
112 Angle measurement ground truth sensor
200 Trailer at vehicle
200a Trailer at data collecting device or vehicle
202 Trailer tongue or hitch of trailer 200
202a Trailer tongue or hitch of trailer 200a
300 Trailer angle estimation module
302 Image data captured by and communicated from the backup camera
304 Output estimated trailer angle
306 CNN selection & view localization
308a-n array of convolution neural network with classification output
309a-n array of convolution neural network with trailer edge detection output
310 Decision merge
312 Trailer edge detection output
314 Trailer length estimation

DESCRIPTION OF THE PREFERRED EMBODIMENTS

A vehicle vision system and/or driving assist system and/or object detection system and/or alert system operates to capture images exterior of the vehicle and may process the captured image data to display images and/or to detect objects at or near the vehicle and in the predicted path of the vehicle, such as to assist a driver of the vehicle in maneuvering the vehicle in a rearward direction. For example, image data captured by a rear backup camera of the vehicle may be processed for object detection during a reversing maneuver of the vehicle and/or images derived from the captured image data may be displayed at a display screen for viewing by the driver during a reversing maneuver of the vehicle. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like. For example, the rear camera may comprise part of a multi-camera vision system of the vehicle, and image data captured by the camera and other exterior viewing cameras of the multi-camera vision system are processed for display of images surrounding the vehicle during a parking maneuver of the vehicle.

Referring now to the drawings and the illustrative embodiments depicted therein, a vehicle 100 includes an imaging system or vision system that includes at least one exterior viewing imaging sensor or camera, such as a rearward viewing imaging sensor or camera 104 and captures image data representative of a rearward scene, and that is towing a trailer 200. Optionally, the system may optionally include multiple exterior viewing imaging sensors or cameras, such as a forward viewing camera at the front (or at the windshield) of the vehicle, and a sideward/rearward viewing camera at respective sides of the vehicle), which captures images exterior of the vehicle, with the camera having a lens for focusing images at or onto an imaging array or imaging plane or imager of the camera. The vision system includes a control or electronic control unit (ECU) or camera processor 102 that is operable to process image data captured by the camera (such as the rear backup camera) or cameras and may detect objects or the like and/or provide displayed images at a display device for viewing by the driver of the vehicle. The data transfer or signal communication from the camera to the ECU may comprise any suitable data or communication link, such as a vehicle network bus 111 or the like of the equipped vehicle.

FIG. 1 illustrates a view of the subject vehicle 100 attached to the trailer 200, with the subject vehicle being equipped with the backup camera 104 and the camera processing unit 102.

Figure 2:
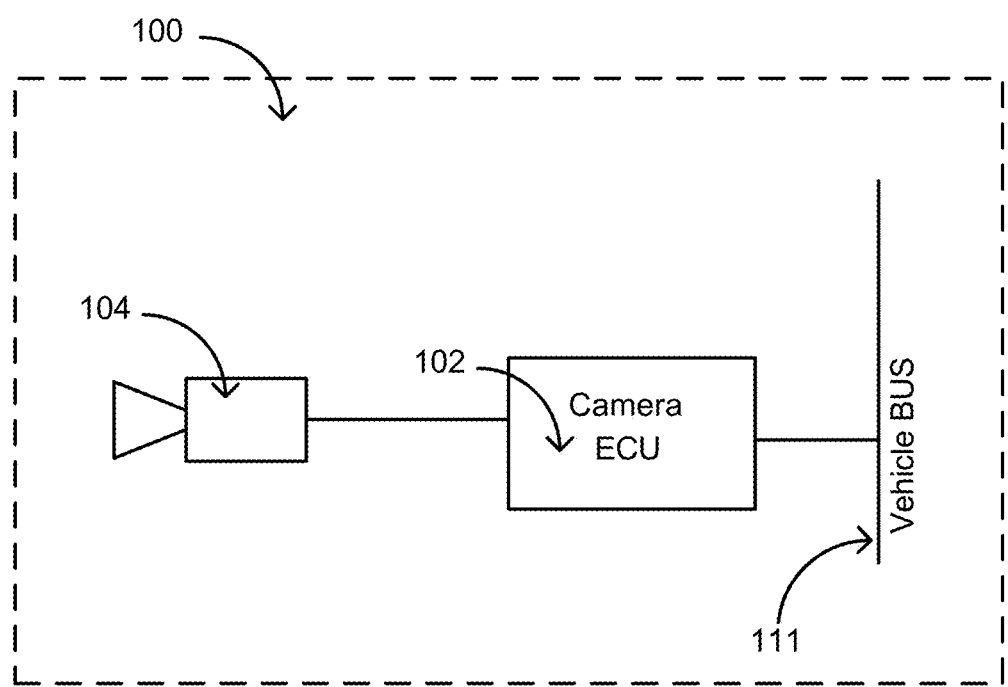
FIG. 2 a block diagram of the trailer angle determination system of the present invention.

FIG. 2 illustrates the system architecture of the major components of the targetless trailer angle detection system, comprising the backup camera 104 connected to the camera processing ECU 102. The ECU 102 is interfaced with the vehicle communication network or bus 111 that receives the vehicle information (such as speed, steering angle, etc.) and transmits or communicates the estimated trailer angle and angle rate information.

Figure 3:
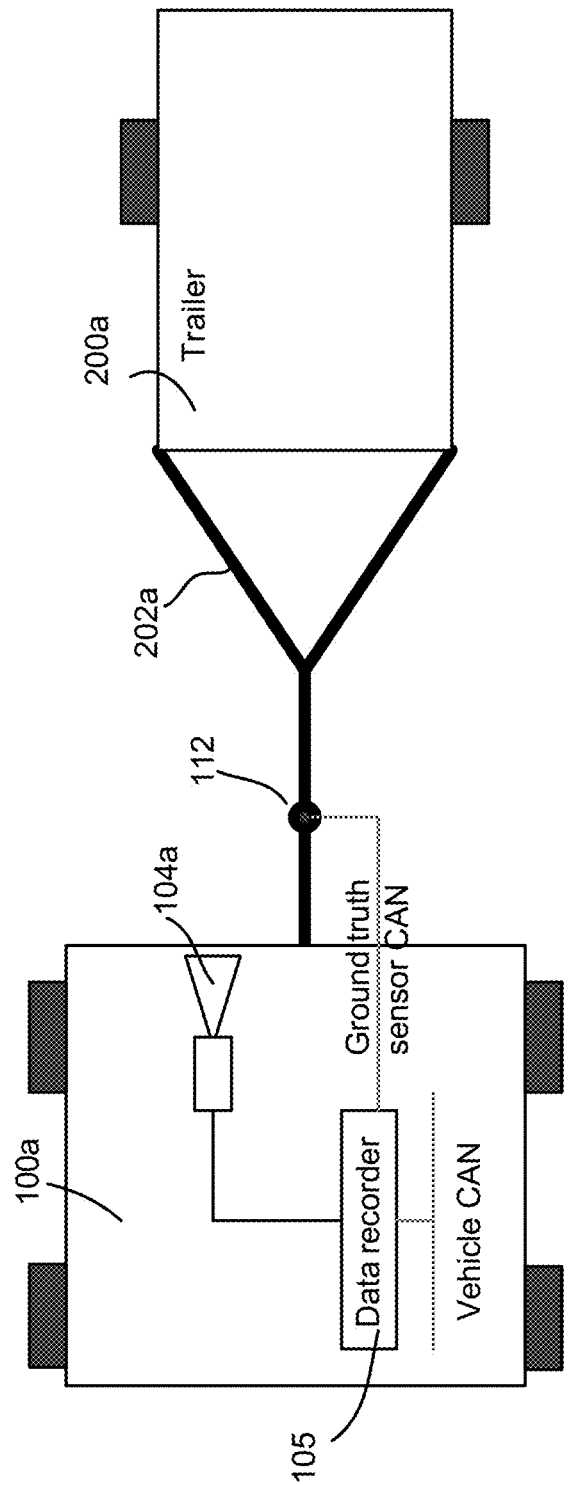
FIG. 3 is a diagram showing the data collection setup for the trailer angle determination system.

FIG. 3 illustrates the data recording setup that comprises a data recording device or vehicle 100a equipped with a data recorder 105 connected to a camera 104a at the data recording vehicle and a ground truth sensor 112 of the data recording vehicle. The ground truth sensor 112 is capable of highly accurately measuring the trailer angle (of the trailer hitch 202a of the trailer 200a attached at the data recording device or vehicle) and transmitting the measured trailer angle over the communication interface to the data recorder 105. The ground truth sensor may comprise a digital sensor that outputs an actual measured trailer angle. For example, the sensor may comprise an electromechanical sensor that is disposed at or attached at the trailer hitch joint at the data recording vehicle, whereby the sensor senses the physical pivoting movement of the trailer relative to the data recording or training vehicle, and generates an output (such as a digital or analog output) indicative of the measured or sensed trailer angle. The data recorder 105 records the synchronized information of the camera data and the ground truth data in real time. This synchronized data will be used during the training phase of the machine learning algorithm.

The data collecting device or vehicle may comprise a movable vehicle or platform that moves with the training trailer 200a attached thereto, such that image data captured by the camera 104a is processed and correlated with or compared with or synchronized with the true or actual or determined angle measurements provided by the sensor 112. Optionally, the data collecting device may comprise a stationary platform or device and the trailer hitch 202a may comprise only a hitch portion of a selected trailer type, whereby the hitch portion may be pivoted through a range of angles relative to a hitch ball of the data collecting device in order to synchronize or correlate or compare the image data captured by the camera 104a during the pivotal movement of the trailer hitch with the angle measurements provided by the sensor 112. The training phase or process may synchronize or correlate or compare image data captured by the camera 104a while pivoting various trailer hitches with the angle measurements provided by the sensor 112. For example, the system may first train the control (such as via collecting data while pivoting the trailer hitch and capturing image data and while measuring the trailer angle) to recognize a Y bar trailer hitch and determine the angles of the trailer hitch, and then may train the control to recognize a V bar trailer hitch and determine the angles of the trailer hitch, and so on, so a trained control (with the trained software as trained at the data collecting device), when implemented in a vehicle, can recognize any typical trailer hitch configuration of a trailer being towed by the vehicle and can determine the trailer angle of the trailer relative to the vehicle as the vehicle and trailer are moved or driven along a road (in either the forward or reverse direction).

The initial setup or training phase or process functions to determine trailer hitch information responsive to collecting trailer hitch data while processing by the processor of image data captured by the camera and responsive to determined angles of the trailer hitch relative to the data recording device as determined by the angle measuring device. Data derived from or representative of the determined trailer hitch information is provided to an electronic device (such as a controller or processor of the vehicle or of the rear backup camera of the vehicle or the like). A subject vehicle, having a hitch ball at a rear portion of the vehicle, and having a rear backup camera, is equipped with the electronic device. A hitch of a trailer is hitched or connected to the hitch ball at the rear portion of the equipped or subject vehicle, whereby the rear backup camera has a field of view that encompasses the hitch ball at the rear portion of the equipped vehicle and at least a portion of the hitch of the trailer hitched to the hitch ball at the rear portion of the equipped vehicle. Using the data representative of the determined trailer hitch information that was provided to the electronic device, and responsive to processing by the processor of image data captured by the rear backup camera, an angle of the trailer relative to the equipped vehicle is determined as the equipped vehicle and trailer move along the road.

Figure 4:
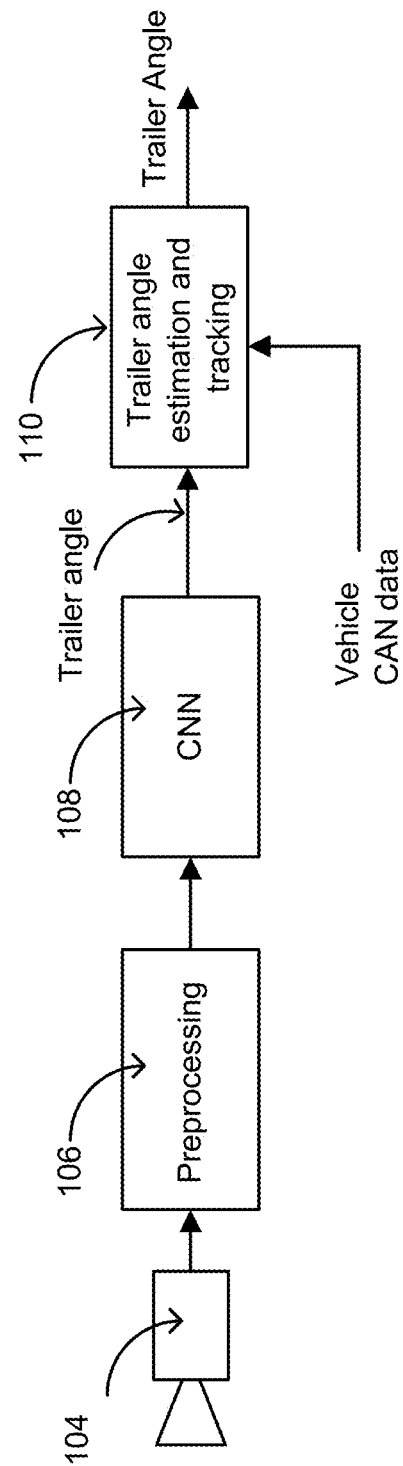
FIG. 4 is a flow diagram of the trailer angle determination.

FIG. 4 illustrates a block diagram of the trailer angle estimation algorithm comprising a preprocessing module 106 that receive the images from the backup camera 104. The preprocessed image or image data is input to the trained convolution neural network (CNN) 108 that outputs the trailer angle.

The CNN may extract features out of any type of the hitch bar (e.g., a Y bar, a V bar or a straight bar or the like) to estimate the angle of the trailer relative to the vehicle, and not the exact trailer type. Thus, during the training phase, the system first trains the network or model with different trailer bar types, so the system can better estimate the trailer angle for a particular type of trailer when that particular type of trailer is attached at the subject vehicle. Thus, the system learns trailer types and a range of angles for the different trailer types when the controller is at a data recording vehicle (during the training phase). After the system learns the trailer types and angles for different trailer types during the training phase, the system (or just a trained controller or trained model or software) is disposed at or implemented at a subject vehicle (e.g., a production vehicle that will be driven along a road) and connected to (such as via a communication network of the vehicle) an already existing rear backup camera of the vehicle (no special camera is required for the trailer angle detection system). When the trained controller is disposed at a vehicle equipped with the trailer angle determining system, the controller (via processing of image data captured by the rear backup camera) determines or estimates the angle of the trailer relative to the vehicle as the vehicle tows a trailer during normal operating conditions.

The CNN 108 is trained using an end to end learning technique, where the network is trained utilizing preprocessed camera data and the synchronized ground truth data collected from the ground truth sensor 112. When the trained CNN 108 is subjected to the preprocessed image or image data in real time it predicts the corresponding trailer angle, and this instantaneous trailer angle is processed via the trailer angle estimation and tracking module 110, which provides a smooth trailer angle output. The trailer angle estimation and tracking module 110 may utilize the vehicle data and a kinematic model of the vehicle and trailer assembly to improve the accuracy of prediction.

Figure 5:
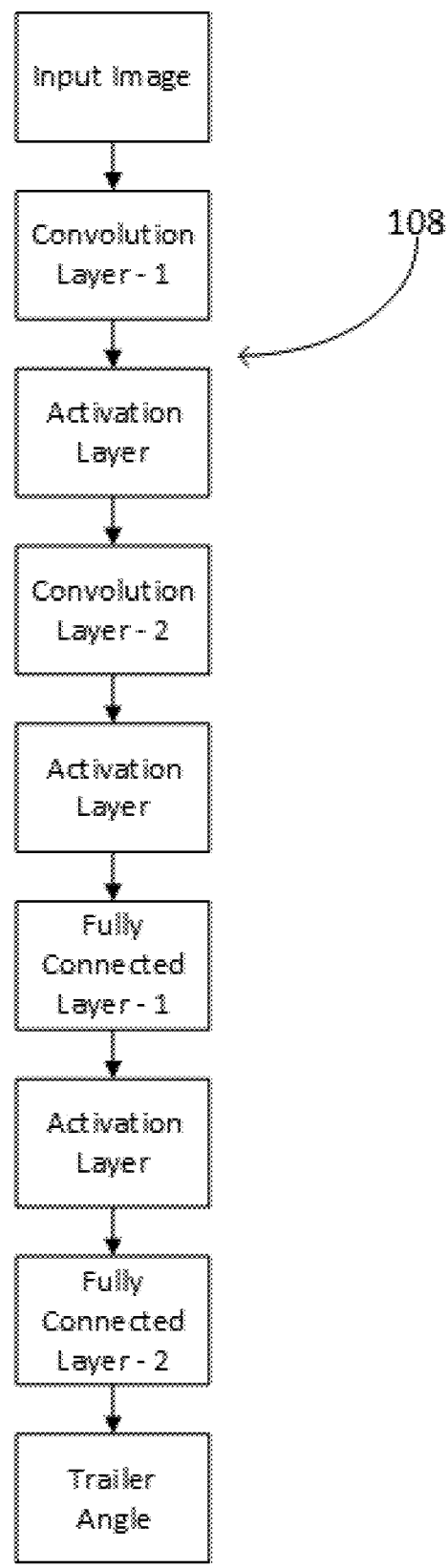
FIG. 5 is a flow diagram showing a convolution neural network example.

FIG. 5 illustrates an example of the end to end convolution neural network (CNN). The CNN 108 comprises multiple convolution layers and activation layers and fully connected layers to process the input image or image data so as to arrive at the determined trailer angle. For example, the CNN includes a first convolution layer to identify or detect features and that generates a map of values that is input into the next layer (an activation layer), which further processes or filters the input to detect higher level features. The fully connected layer receives an input from the last of the other layers and generates a value or vector or plurality of values that are used to identify or classify the type of trailer. Based on the training of the system, the values output from the CNN can be processed to determine or identify or classify the trailer type and angle of the trailer.

Figure 6A:
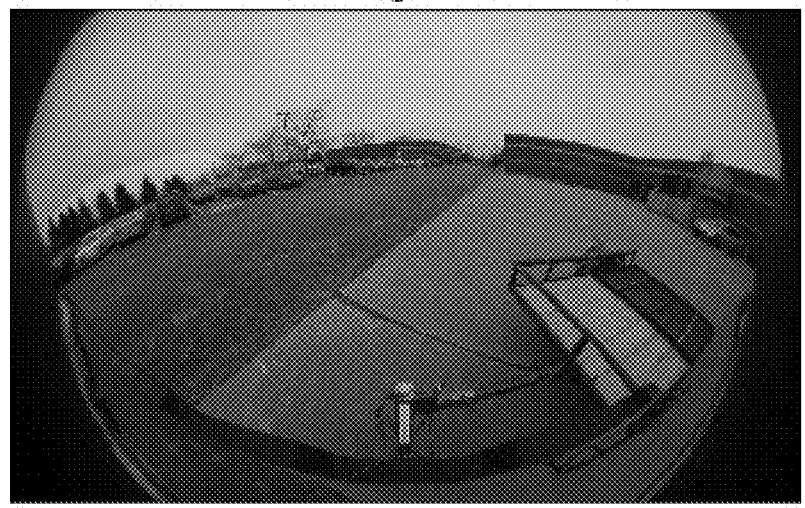
FIG. 6A is a raw image as captured by a rear camera of the vehicle.
Figure 6B:
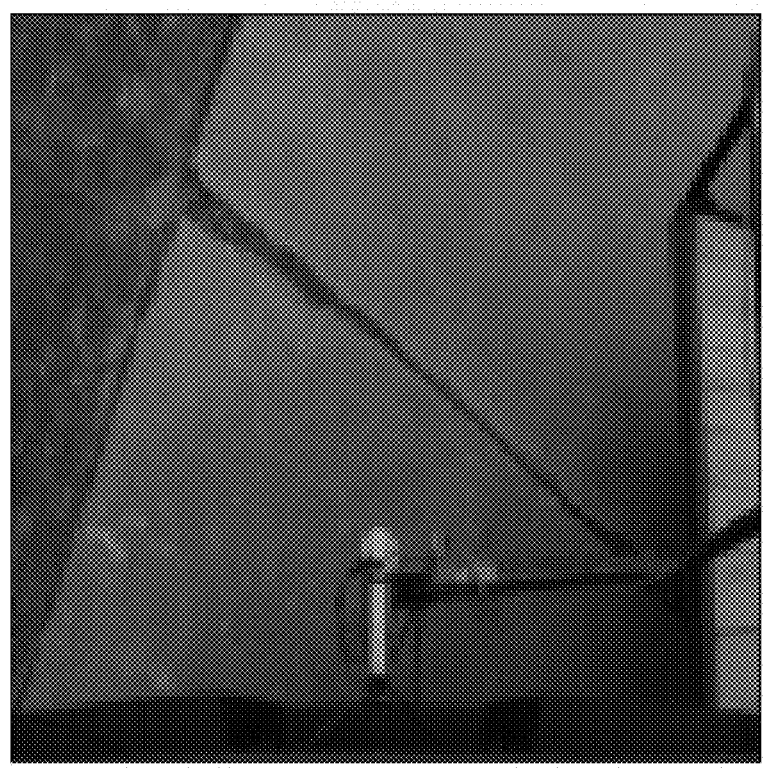
FIG. 6B is a processed image after processing of the raw image of FIG. 6A by the trailer angle determination system of the present invention.

In one embodiment, the preprocessing module 106 transforms the image such that it appears as if it is viewed from above the tow ball, such that the region of interest is selected (such as by focusing on the trailer tongue 102 and hitch assembly as shown in FIGS. 6A and 6B). Also, the preprocessing transformation allows for better control of the mapping between the change of angle of the trailer and the number of pixels, and thus the system can obtain a greater number of pixels per degree for angles close to zero as compared to angles further from zero.

In another embodiment, the preprocessing module 106 provides multiple transformed views such that different views of the trailer tongue 102 are visible, so that the CNN 108 may extract the features out of the trailer tongue 102 via different viewing angles to estimate the trailer tongue position and hence the trailer angle relative to the towing vehicle.

In another embodiment, the preprocessing module 106 process the image or image data to generate the depth information such as an inverse transform. Since the trailer tongue 102 will always be above the ground, the CNN 108 may utilize the depth information to eliminate the background and extract more information from the trailer tongue 102.

In another embodiment, the CNN 108 performs a multi-step classification. In the first step it predicts with a certain confidence whether a trailer (or trailer tongue) is present and attached, present and not attached, or not present behind the vehicle. In the second step, if presence of the trailer (or trailer tongue) is true, then it classifies the trailer (or trailer tongue) to be of a particular category. Examples of trailers are utility trailer, box trailer, etc. Examples of trailer tongues are V-shaped, Y-shaped, etc.

Figure 7:
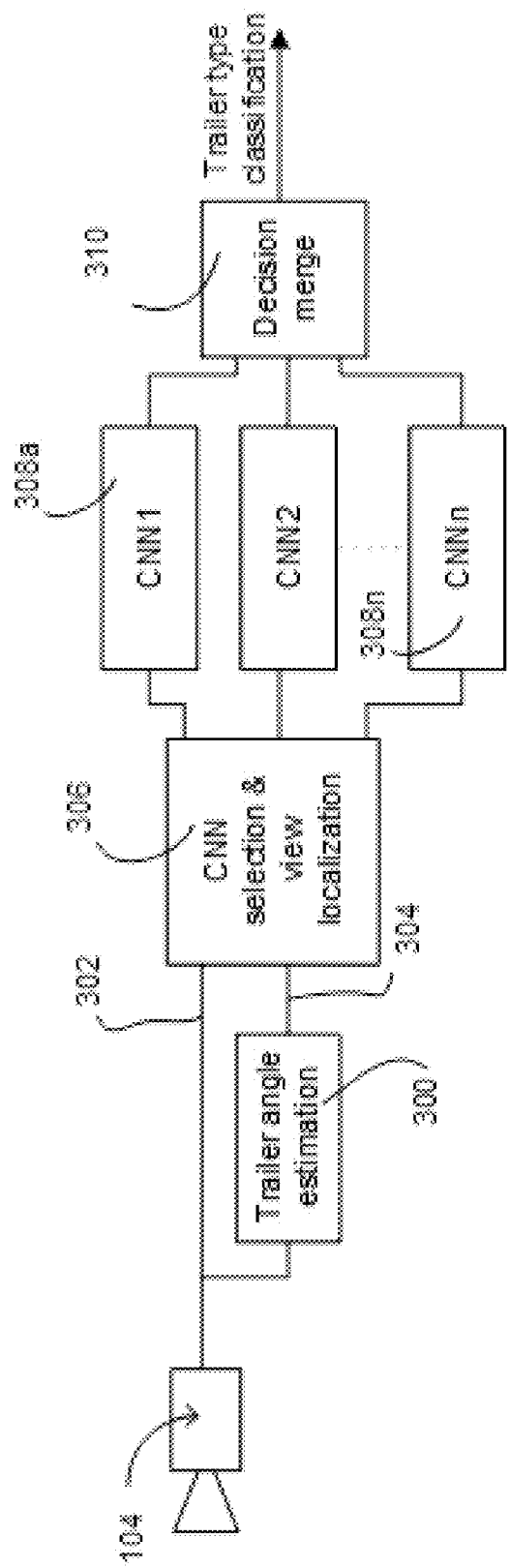
FIG. 7 is a flow diagram showing a trailer recognition process of the present invention.

In another embodiment, the CNN may classify the type of trailer, invariant of the payload on it, such as shown in FIG. 7. For example, a trailer with a boat or a bike as payload. As the appearance of the trailer from the backup camera is highly sensitive to the trailer angle it is important to utilize an array of 'n' micro CNNs 308*a-n* to detect the type of the trailer (otherwise, a very large deep CNN may be needed, which may not be practical to implement in the ECU). The Trailer Angle Estimation module 300 provides the trailer angle 304. The CNN Selection and View Localization module 306 takes the angle estimate as an input and selects an appropriate micro CNN (or a combination of micro CNNs) which is tuned for that range of angle. The decisions from the micro-CNN(s) are then combined in the Decision Merge module 310 to recognize the trailer type. The CNN Selection and View Localization module 306 reduces the search space by localizing the position of the trailer in the entire image.

Figure 8:
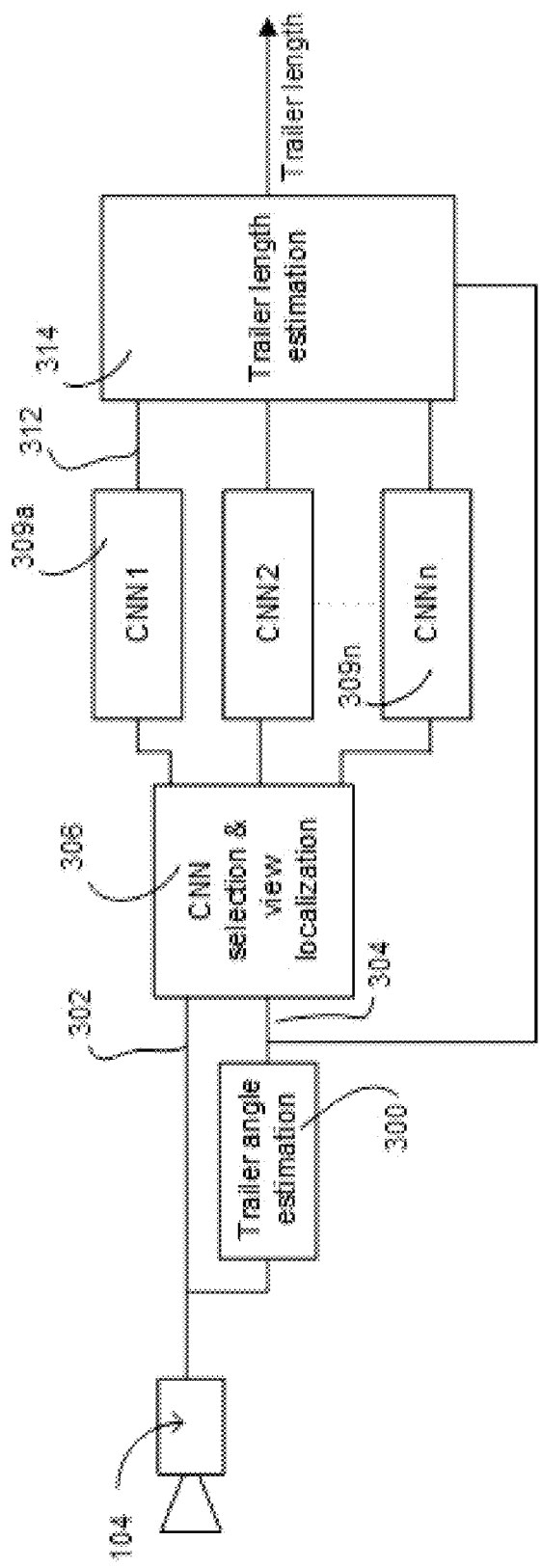
FIG. 8 is a flow diagram showing a trailer length estimation process of the present invention.

Optionally (and such as shown in FIG. 8), an array of CNN 1-*n* 309*a* provides three dimensional bounding boxes 312 [right rectangular prism] encapsulating the end of the trailer when the back edge of the trailer starts appearing in the view. The trailer length estimation module 314 utilizes the trailer angle estimation information and the corresponding length of the 3D bounding box to estimate the trailer length.

Therefore, the present invention provides a system and method that uses image data captured by the vehicle's rear backup camera and data input from a training process (such as ground truth angle information from an angle measurement ground truth sensor), and that processes the data to train a Convolution Neural Network (or other type of machine learning algorithm). The trained model is deployed at a vehicle and, responsive to a test image data input, will process the test image data input and predict the correct trailer angle. The test image is preprocessed before feeding into the Convolution Neural Network (CNN). Preprocessing may include scaling, cropping, and/or transforming the image. With the use of communication network bus (such as a CAN bus) data, trailer tracking will be used to obtain a more robust estimate of the angle.

The system may utilize aspects of the trailering or trailer angle detection systems described in U.S. Pat. Nos. 9,085,261 and/or 6,690,268, and/or U.S. Publication Nos. US-2017-0254873; US-2017-0217372; US-2017-0050672; US-2015-0217693; US-2014-0160276; US-2014-0085472 and/or US-2015-0002670, and/or U.S. patent application Ser. No. 15/928,128, filed Mar. 22, 2018, Ser. No. 15/928,126, filed Mar. 22, 2018, Ser. No. 15/910,100, filed Mar. 2, 2018, Ser. No. 15/885,855, filed Feb. 1, 2018, and/or Ser. No. 15/878,512, filed Jan. 24, 2018, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138170; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties. Optionally, the vision system (utilizing the forward viewing camera and a rearward viewing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for determining trailer angle, said method comprising:
providing a data recording device;
wherein the data recording device has a camera disposed thereat;
wherein the camera has a field of view that encompasses a hitch ball of the data recording device;
wherein the data recording device comprises a processor operable to process image data captured by the camera;
hitching a trailer hitch at the hitch ball of the data recording device and pivoting the trailer hitch about the hitch ball of the data recording device;
capturing image data via the camera while the trailer hitch pivots about the hitch ball of the data recording device;

determining angles of the trailer hitch relative to the data recording device via an angle measuring device while the trailer hitch pivots about the hitch ball of the data recording device;

while the trailer hitch pivots about the hitch ball of the data recording device, determining trailer hitch information responsive to processing by the processor of image data captured by the camera and responsive to determined angles of the trailer hitch relative to the data recording device as determined by the angle measuring device;

after determining trailer hitch information, providing data representative of the determined trailer hitch information to an electronic device;

equipping a vehicle with the electronic device, wherein the equipped vehicle has a hitch ball at a rear portion of the equipped vehicle, and wherein the equipped vehicle is equipped with a rear backup camera;

hitching a hitch of a trailer to the hitch ball at the rear portion of the equipped vehicle;

wherein the rear backup camera has a field of view that encompasses the hitch ball at the rear portion of the equipped vehicle and at least a portion of the hitch of the trailer hitched to the hitch ball at the rear portion of the equipped vehicle;

capturing image data via the rear backup camera and processing, via a processor at the equipped vehicle, image data captured by the rear backup camera as the equipped vehicle and trailer move along a road;

using the data representative of the determined trailer hitch information that was provided to the electronic device, and responsive to processing by the processor of image data captured by the rear backup camera, determining an angle of the trailer relative to the equipped vehicle as the equipped vehicle and trailer move along the road;

wherein determining the angle of the trailer relative to the equipped vehicle comprises use of a neural network; and wherein determining the angle of the trailer comprises use of a convolution neural network having a plurality of micro convolution neural networks, and wherein said method comprises detecting a type of the trailer using the micro convolution neural networks.

2. A method for determining trailer angle, said method comprising:

providing a data recording device;

wherein the data recording device has a camera disposed thereat;

wherein the camera has a field of view that encompasses a hitch ball of the data recording device;

wherein the data recording device comprises a processor operable to process image data captured by the camera;

hitching a trailer hitch at the hitch ball of the data recording device and pivoting the trailer hitch about the hitch ball of the data recording device;

capturing image data via the camera while the trailer hitch pivots about the hitch ball of the data recording device;

determining angles of the trailer hitch relative to the data recording device via an angle measuring device while the trailer hitch pivots about the hitch ball of the data recording device;

wherein the angle measuring device comprises an electromechanical device that is disposed at a hitch joint between the trailer hitch and the hitch ball of the data recording device;

while the trailer hitch pivots about the hitch ball of the data recording device, determining trailer hitch information responsive to processing by the processor of image data captured by the camera and responsive to determined angles of the trailer hitch relative to the data recording device as determined by the angle measuring device;

after determining trailer hitch information, providing data representative of the determined trailer hitch information to an electronic device;

equipping a vehicle with the electronic device, wherein the equipped vehicle has a hitch ball at a rear portion of the equipped vehicle, and wherein the equipped vehicle is equipped with a rear backup camera;

hitching a hitch of a trailer to the hitch ball at the rear portion of the equipped vehicle;

wherein the rear backup camera has a field of view that encompasses the hitch ball at the rear portion of the equipped vehicle and at least a portion of the hitch of the trailer hitched to the hitch ball at the rear portion of the equipped vehicle;

capturing image data via the rear backup camera and processing, via a processor at the equipped vehicle, image data captured by the rear backup camera as the equipped vehicle and trailer move along a road; and using the data representative of the determined trailer hitch information that was provided to the electronic device, and responsive to processing by the processor of image data captured by the rear backup camera, determining an angle of the trailer relative to the equipped vehicle as the equipped vehicle and trailer move along the road.

3. The method of claim 2, wherein determining the angle of the trailer relative to the equipped vehicle comprises use of a neural network.

4. The method of claim 3, wherein the neural network receives image data captured by the rear backup camera and processes the received image data via at least one convolution layer, at least one activation layer and at least one fully connected layer.

5. The method of claim 2, wherein the electronic device is part of the rear backup camera.

6. The method of claim 2, comprising (a) pre-processing image data captured by the camera of the data recording device to transform the captured image data to be representative of a viewing angle above the hitch ball of the data recording device, and wherein pre-processed image data is input to the data recording device when determining trailer hitch information, and (b) pre-processing image data captured by the rear backup camera of the equipped vehicle to transform the captured image data to be representative of a viewing angle above the hitch ball of the equipped vehicle, and wherein pre-processed image data is input to the electronic device for processing with the data representative of the determined trailer hitch information that was provided to the electronic device.

7. The method of claim 2, wherein determining trailer hitch information synchronizing determined angles of the trailer hitch relative to the data recording device with the image data captured by the camera.

8. The method of claim 2, wherein determining trailer hitch information comprises correlating image data captured by the camera with determined angles of the trailer hitch as determined by the angle measuring device.

9. The method of claim 2, wherein video images derived from image data captured by the rear backup camera are displayed at a display screen of the equipped vehicle for viewing by a driver of the equipped vehicle during a reversing maneuver of the equipped vehicle.

10. The method of claim 9, wherein image data captured by the rear backup camera is processed to detect objects rearward of the equipped vehicle during the reversing maneuver of the equipped vehicle.

11. The method of claim 2, wherein the rear backup camera comprises part of a multi-camera vision system of the equipped vehicle, and wherein image data captured by the rear backup camera and other exterior viewing cameras of the multi-camera vision system are processed for display of video images surrounding the equipped vehicle during a parking maneuver of the equipped vehicle.

12. The method of claim 2, wherein the trailer hitched at the hitch ball at the rear portion of the equipped vehicle comprises a targetless trailer.

13. A method for determining trailer angle, said method comprising:
provides a data recording device;
wherein the data recording device has a camera disposed thereat;
wherein the camera has a field of view that encompasses a hitch ball of the data recording device;
wherein the data recording device comprises a processor operable to process image data captured by the camera;
hitching a trailer hitch at the hitch ball of the data recording device and pivoting the trailer hitch about the hitch ball of the data recording device;
capturing image data via the camera while the trailer hitch pivots about the hitch ball of the data recording device;
determining angles of the trailer hitch relative to the data recording device via an angle measuring device while the trailer hitch pivots about the hitch ball of the data recording device;
wherein the angle measuring device comprises an electromechanical device that is disposed at a hitch joint between the trailer hitch and the hitch ball of the data recording device;
while the trailer hitch pivots about the hitch ball of the data recording device, determining trailer hitch information responsive to processing by the processor of image data captured by the camera and responsive to determined angles of the trailer hitch relative to the data recording device as determined by the angle measuring device;
wherein determining trailer hitch information comprises synchronizing determined angles of the trailer hitch relative to the data recording device with the image data captured by the camera;
after determining trailer hitch information, providing data representative of the determined trailer hitch information to an electronic device;
equipping a vehicle with the electronic device, wherein the equipped vehicle has a hitch ball at a rear portion of the equipped vehicle, and wherein the equipped vehicle is equipped with a rear backup camera;
hitching a hitch of a trailer to the hitch ball at the rear portion of the equipped vehicle;
wherein the rear backup camera has a field of view that encompasses the hitch ball at the rear portion of the equipped vehicle and at least a portion of the hitch of the trailer hitched to the hitch ball at the rear portion of the equipped vehicle;
capturing image data via the rear backup camera and processing, via a processor at the equipped vehicle, image data captured by the rear backup camera as the equipped vehicle and trailer move along a road;
using the data representative of the determined trailer hitch information that was provided to the electronic device, and responsive to processing by the processor of image data captured by the rear backup camera, determining an angle of the trailer relative to the equipped vehicle as the equipped vehicle and trailer move along the road;
wherein determining the angle of the trailer relative to the equipped vehicle comprises use of a neural network; and
wherein video images derived from image data captured by the rear backup camera are displayed at a display screen of the equipped vehicle for viewing by a driver of the equipped vehicle during a reversing maneuver of the equipped vehicle.

14. The method of claim 13, wherein the neural network receives image data captured by the rear backup camera and processes the received image data via at least one convolution layer, at least one activation layer and at least one fully connected layer.

15. The method of claim 13, wherein image data captured by the rear backup camera is processed to detect objects rearward of the equipped vehicle during the reversing maneuver of the equipped vehicle.

16. The method of claim 13, wherein the electronic device is part of the rear backup camera.

17. A method for determining trailer angle, said method comprising:
providing a data recording device;
wherein the data recording device has a camera disposed thereat;
wherein the camera has a field of view that encompasses a hitch ball of the data recording device;
wherein the data recording device comprises a processor operable to process image data captured by the camera;
hitching a trailer hitch at the hitch ball of the data recording device and pivoting the trailer hitch about the hitch ball of the data recording device;
capturing image data via the camera while the trailer hitch pivots about the hitch ball of the data recording device;
determining angles of the trailer hitch relative to the data recording device via an angle measuring device while the trailer hitch pivots about the hitch ball of the data recording device;
wherein the angle measuring device comprises an electromechanical device that is disposed at a hitch joint between the trailer hitch and the hitch ball of the data recording device;
while the trailer hitch pivots about the hitch ball of the data recording device, determining trailer hitch information responsive to processing by the processor of image data captured by the camera and responsive to determined angles of the trailer hitch relative to the data recording device as determined by the angle measuring device;
after determining trailer hitch information, providing data representative of the determined trailer hitch information to an electronic device;
equipping a vehicle with the electronic device, wherein the equipped vehicle has a hitch ball at a rear portion of the equipped vehicle, and wherein the equipped vehicle is equipped with a rear backup camera;
hitching a hitch of a trailer to the hitch ball at the rear portion of the equipped vehicle, wherein the trailer hitched to the hitch ball at the rear portion of the equipped vehicle comprises a targetless trailer;

wherein the rear backup camera has a field of view that encompasses the hitch ball at the rear portion of the equipped vehicle and at least a portion of the hitch of the trailer hitched to the hitch ball at the rear portion of the equipped vehicle;

capturing image data via the rear backup camera and processing, via a processor at the equipped vehicle, image data captured by the rear backup camera as the equipped vehicle and trailer move along a road;

using the data provided to the electronic device, and responsive to processing by the processor of image data captured by the rear backup camera, determining an angle of the trailer relative to the equipped vehicle as the equipped vehicle and trailer move along the road; and wherein the rear backup camera comprises part of a multi-camera vision system of the equipped vehicle, and wherein image data captured by the rear backup camera and other exterior viewing cameras of the multi-camera vision system are processed for display of video images surrounding the equipped vehicle during a parking maneuver of the equipped vehicle.

18. The method of claim 17, wherein determining the angle of the trailer comprises use of a neural network, and wherein the neural network receives image data captured by the rear backup camera and processes the received image data via at least one convolution layer, at least one activation layer and at least one fully connected layer.

19. The method of claim 17, wherein determining trailer hitch information comprises correlating image data captured by the camera with determined angles of the trailer hitch as determined by the angle measuring device.

\* \* \* \* \*